United States Patent [19]

Marshall

[11] 4,012,014
[45] Mar. 15, 1977

[54] AIRCRAFT FLIGHT CONTROLLER

[75] Inventor: Lawrence E. Marshall, Ferguson, Mo.

[73] Assignee: McDonnell Douglas Corporation, St. Louis, Mo.

[22] Filed: Sept. 11, 1975

[21] Appl. No.: 612,359

[52] U.S. Cl. .................. 244/83 F; 74/471 XY; 74/523

[51] Int. Cl.² .......................... B64C 13/04

[58] Field of Search .............. 244/83 R, 83 F, 83 E, 244/83 B, 122 R, 122 AG; 74/471 R, 471 XY, 491, 523; 200/6 A; 297/115, 411

[56] References Cited
UNITED STATES PATENTS

| 3,011,739 | 12/1961 | Boyce et al. | 74/471 XY |
| 3,095,754 | 7/1963 | Mayon et al. | 74/471 XY |
| 3,409,252 | 11/1968 | Miller | 244/83 F |
| 3,454,920 | 7/1969 | Mehr | 244/83 E |
| 3,580,636 | 5/1971 | Setto | 244/83 F |
| 3,625,082 | 12/1971 | Wuller et al. | 74/471 XY |
| 3,705,519 | 12/1972 | Sjoo | 74/471 XY |
| 3,800,615 | 4/1974 | Pilch | 74/471 XY |

Primary Examiner—Trygve M. Blix
Assistant Examiner—Galen L. Barefoot
Attorney, Agent, or Firm—Gravely, Lieder & Woodruff

[57] ABSTRACT

An aircraft fly-by-wire flight controller requiring essentially only hand motion or rotation about a fixed center point residing in the centerline of the palm grip of the pilot's hand to thereby avoid problems with arm movement, and wherein the flight controller consists of a formed grip to fit the grasp of the fingers and palm of the hand, permit finger and/or thumb access to all switches carried by the grip, and reduce fatigue by concentrating the fore and aft pitch control movement and the lateral roll control movement in the normal palm grip center point.

7 Claims, 6 Drawing Figures

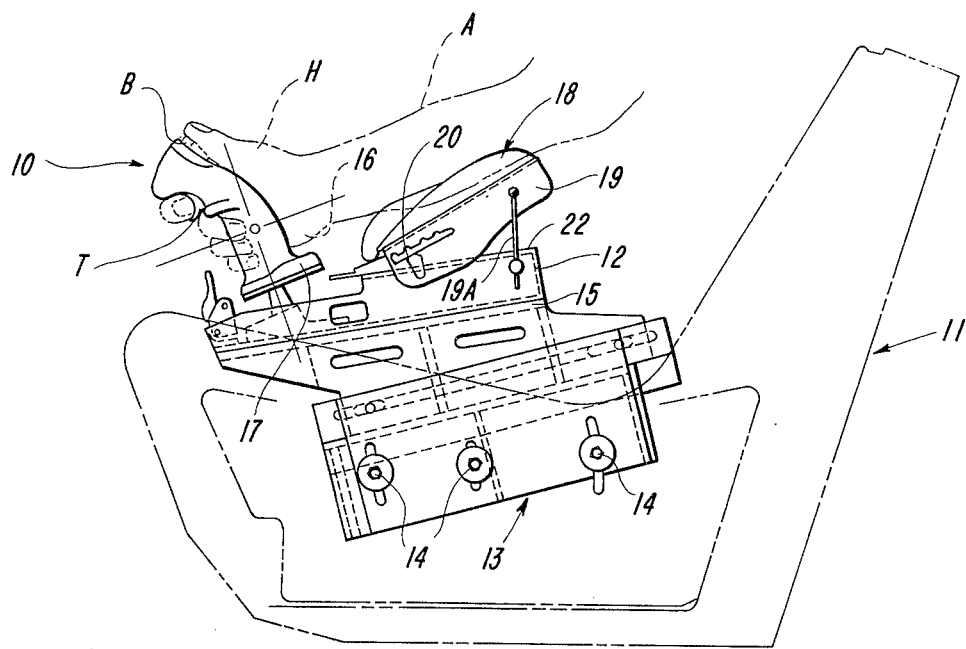
FIG. 1
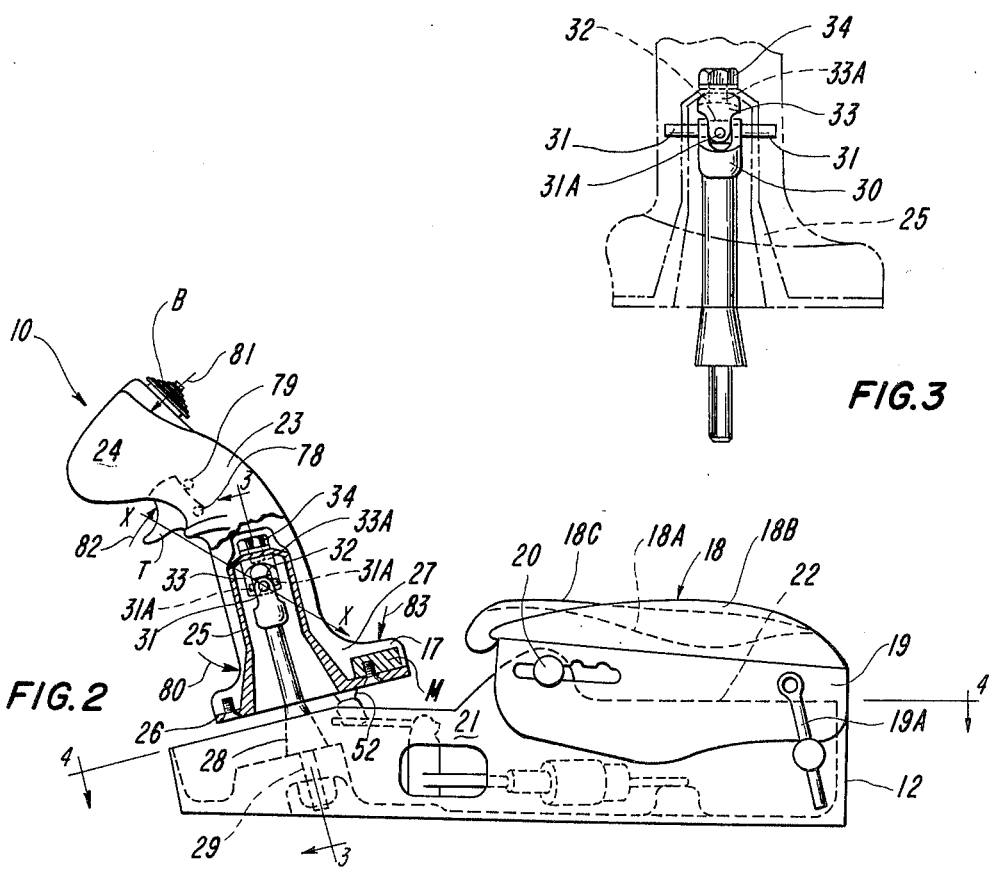
FIG. 2
FIG. 3

AIRCRAFT FLIGHT CONTROLLER

BRIEF SUMMARY OF THE INVENTION

The invention relates to an improved aircraft flight controller.

The problems connected with flight control levers, sticks and the like are pilot arm motion fatigue, location of the pivot axis for the lever below the hand which creates a moment arm coupled with inertia and g forces, presence of pilot body couple during maneuvers, poor control harmony, and imposition of unintentional flight control commands. Such problems are particularly present in fly-by-wire control systems, side stick placement, and control means for space vehicles.

The present flight controller overcomes the foregoing problems by providing a flight controller mounted by means establishing its motion about the center of the palm grip of the pilot so that there is substantially zero arm motion, and which grounds out inertia and g forces. The flight controller is mounted so as to call for only hand rotation about axes intersecting at a point essentially in the center of the palm grip of the hand, thereby virtually eliminating body couple, sensitivity to outside forces and pilot fatigue.

The advantages for the present flight controller are achieved by providing a formed hand grip with a hand heel support, a body for the hand grip small enough to allow thumb and finger manipulation of buttons without releasing control of the grip, and means establishing a universal joint support for the hand grip that is in the center of movement of the palm grip for hand rotation fore and aft in the vertical plane and hand roll from side to side still in the center of movement.

In a presently preferred embodiment of the invention the side mounted controller for imparting signals to govern flight attitude comprises a hand grip supported on a fixed post by a multi-axis universal joint or knuckle located within the hand grip to place the intersection of the axes at substantially the center of the finger and palm grasp of the hand grip, and flight attitude signalling means operatively connected to the hand grip at spaced locations, whereby flight attitude governing signals may be generated indivdually and collectively by movement of said hand grip about said axes independently and conjointly.

In the broad form of the present invention the side mounted aircraft flight controller comprises a hand grip member formed to comfortably receive the grasp of the pilot's hand by wrapping the fingers and thumb around the grip member in the form of a fist, a universal joint device mounted within the grip member and defining a plurality of aircraft flight control axes having a common point of intersection which is substantially in the center of the palm grip so that movement of the grip member can be achieved by rotating the hand about the point of intersection free of arm movement or body coupling to the aircraft maneuvers, and signalling devices operatively connected to the grip member at locations displaced from each other and from the common point of intersection of the flight control axes.

An important provision of the present invention resides in the form of the hand grip and in its mounting such that for pitch control the grip is provided with surfaces spaced about a common pivot axis to form pressure points for the fingers and hand to move the grip while still allowing the pilot to use the pivot as a fixed reference for overcoming g forces.

BRIEF DESCRIPTION OF THE DRAWINGS

The presently preferred embodiment of this invention is shown in the accompanying drawings, wherein:

FIG. 1 is a side elevational view of the present flight controller shown in its neutral position, and also shown in association with a pilots seat depicted in phantom outline;

FIG. 2 is an enlarged and partly sectioned side view of the flight controller assembly;

FIG. 3 is a fragmentary sectional view showing the mounting for the hand grip the view being taken along line 3—3 in FIG. 2;

DETAILED DESCRIPTION OF THE PREFERRED EMBODIMENT

Figure 4:
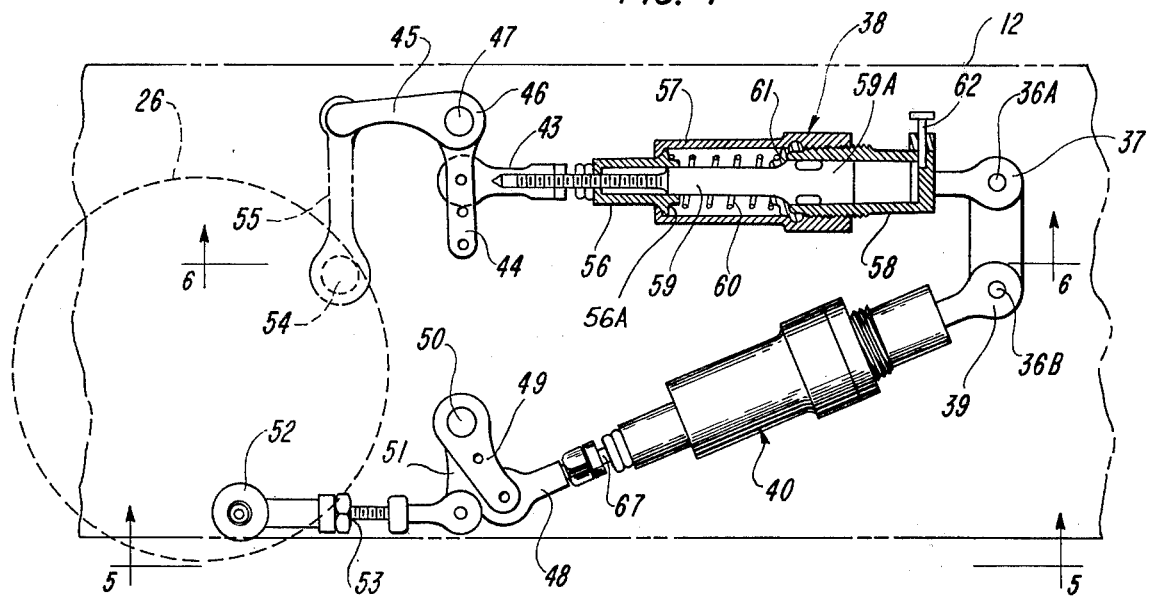
FIG. 4 is a view taken at line 4—4 in FIG. 2.

The present flight controller is shown in FIG. 1 at 10 in relation to the pilot's seat 11 which is shown in phantom outline. The controller 10 is operably mounted on a box frame 12 supported at the side of the seat 11 on a suitable support 13 which may be adjusted by means of the threaded elements 14 securing the support 13 in a desired position such that the plane of the support plate 15 can be angularly set to suit the convenience and comfort of the pilot in the seat 11. There is shown in phantom outline the right arm A and hand H in one position where the hand H has the fingers wrapped around the controller 10 to place the controller in the palm of the hand, whereby the thumb is free to move to actuate one or more control buttons B on the head of the controller 10, and the forefinger is in position to actuate a trigger T. When the controller 10 is grasped in the manner shown in FIG. 1 the hand H makes a fist around the body of the controller so that the heel 16 of the hand is in a position supported on a flange 17 located adjacent the base of controller 10. The forearm is suitably supported on a cushion or pad 18 mounted on an adjustment frame 19 movable about a pivot 20 carried in a pair of upstanding tabs 21 on the upper surface 22 of the box 12 and adjustably held by rod 19A.

Turning now to FIG. 2 the controller 10 comprises a formed hand grip 23 which is given a configuration such that the head 24 of the grip curves forwardly so as to place the control buttons B in a position to be manipulated by the thumb of the pilot's hand H. The hand grip 23 is provided with an internal support thimble 25 which has a closed upper end and extends downwardly to a lower flange 26 to receive the lower enlarged skirt 27 of the hand grip, as well as to support the flange 17 in a position to be engaged by the heel 16 of the pilot's hand. It can be seen in FIGS. 2 and 3 that the hand grip 23 of the controller 10 is supported on a fixed post 28, the lower end of which is secured in a boss 29 in box 12 and extends upwardly into the support thimble 25.

The upper end of the fixed post 28 carries a first yoke 30 which provides the bearings for the pivot elements 31 engaged with the usual trunnion 32 of a universal joint. The cooperating or second yoke 33 is fixed by the stud 33A and nut 34 in the upper end of the thimble 25, and its spaced arms are mounted in the pivot elements 31A also engaged with the trunnion 32. Since this is a standard universal joint, the trunnion 32 carries the respective pivot elements 31 and 31A so that the yokes 30 and 33 will provide the required motion around the pitch axis in the pivot elements 31 and motion around the roll axis in the pivot elements 33. The trunnion 32 represents the common intersection of the axes of the pivot elements 31 and 31A.

In each motion of the hand grip 23 it is observed that the thimble 25 tilts and the flange 26 thereon swings through an arc the center of which is at the point of intersection of the roll axis 32 and the pitch axis 34. The body of the thimble flares outwardly at its bottom end to permit tilting of the hand grip 23 through at least 10° of arc to either side of a neutral position for pitch and for roll control movement. This range of tilting movement of the hand grip 23 is well within the normal range of movement of the hand and aids in avoiding the problems of hand and arm fatigue.

Figure 5:
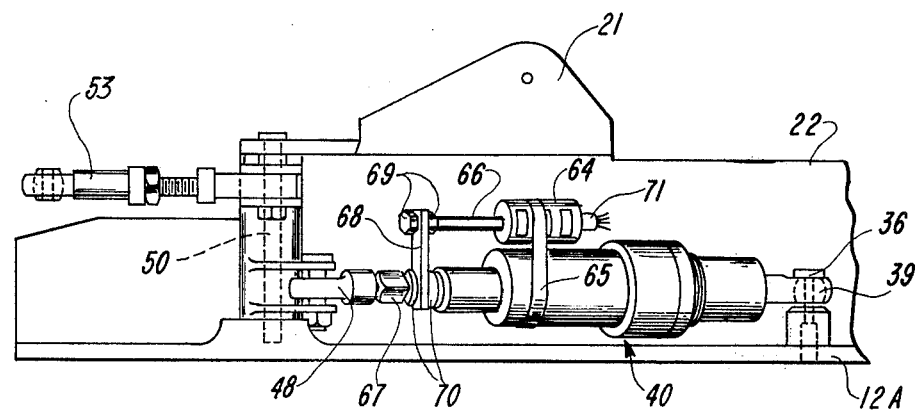
FIG. 5 is a fragmentary sectional view taken at line 5—5 in FIG. 4.
Figure 6:
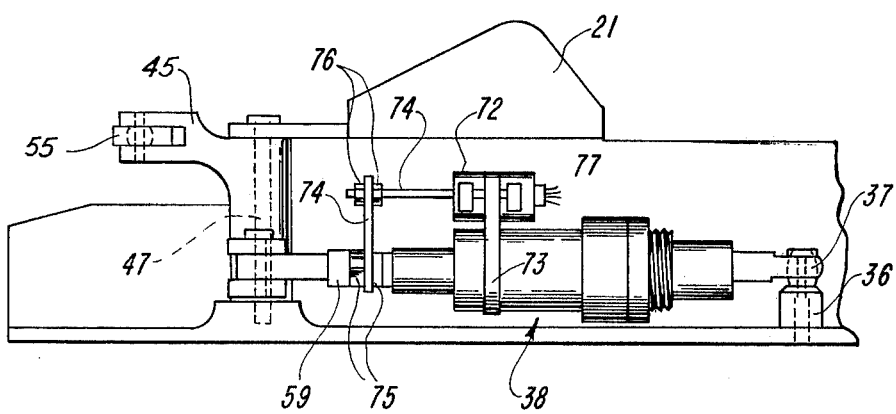
FIG. 6 is a further fragmentary sectional view taken at line 6—6 in FIG. 4.

Attention will now be directed to FIG. 4 through 6 inclusive where the motion of the hand grip 23 is translated into control signals. The box 12 is provided with a boss carrying a pair of pivot posts 36A and 36B which extends vertically from the bottom 12A of the box for the purpose of supporting the pivot eye 37 of a feel cartridge 38, and a pivot eye 39 of a second feel cartridge 40. The cartridges 38 and 40 are maintained in spaced relation by the boss. The feel cartridge 38 is provided with an operating end 43 which may be selectively connected to the arm 44 of a bellcrank having its angularly related arm 45 projecting from the hub 46 which connects the two arms 44 and 45. The hub 46 is mounted on a pivot post 47 fixed in the box 12. As shown, the arm 44 of the bellcrank is provided with 3 apertures for the purpose of connecting the end 43 of the feel cartridge for the purpose of obtaining a desired mechanical relationship between the feel cartridge and the operating end of the bellcrank arm 45. For example, when the feel cartridge end 43 is connected as shown in full line the ratio of the crank arms is 0.5/1, when the end 43 is connected to the middle one of the apertures the ratio is 0.75/1, and when the end 43 is in the outer most aperture of the arm 44 the ratio is 1/1. The feel cartridge 40 is provided with an operating end 48 which is pivotly connected to a crank arm 49 which is operatively supported on a fixed pivot post 50 mounted in the box 12, and the arm 49 is associated with a second arm 51 so that the arms 49 and 51 constitute a bellcrank in which the arm 49 is provided with a pair of attachment apertures for the operating end 48 of the feel cartridge 40 so that when the position is shown in full line the ratio of movement of the bellcrank arms is 1/1, and when the end 48 is attached to the innermost aperture in the arm 49 the motion ratio becomes 0.75/1.

It can be seen in FIG. 4 that the flange 26 on the bottom open end of the support thimble 25 is provided with a boss 52 which furnishes an attachment point for an operating link 53 which connects into the bellcrank arm 51 so as to translate fore and aft motion of the hand grip 23 about the pitch axis into motion of the bellcrank arms 51 and 49 in a direction to activate the feel cartridge 40. It can also be seen that the support thimble flange 26 is provided with a second boss 54 which is angularly displaced from the first mentioned boss 52 by substantially 90°, and an operating link 55 is connected between the boss 54 and the outer end of the bellcrank arm 45, whereby side to side motion of the hand grip 23 about the roll axis 32 will cause the bellcrank arms 45 and 44 to activate the feel cartridge 38. The feel cartridge 38 and 40 are provided with an inter- nal spring preload so as to normally retain the hand grip 23 of the flight controller 10 in a neutral position, and to provide a desired amount of spring resistance or feel in the pilot's hand H for either direction of movement about the pitch axis or the roll axis. The hand grip 23 is also provided with a suitable weight or mass M in the flange 17 to balance the head end 24 of grip which is on the opposite side of the universal joint.

It can be seen in FIG. 4 that the feel cartridge 38 is provided with an extended spring retainer 56 having its inner flanged end captured by a flange 56A engaged in the flanged end of a cylinder 57. The opposite threaded end of the cylinder 57 is mounted on an end cap 58 which, in turn, is a part of the pivotal eye 37. A piston rod 59 is slideably mounted in the end cap 58 and projects outwardly into adjustable contact with the spring retainer 56. A compression spring 60 surrounds the piston 59 and has its ends abutting between the seat 61 adjacent end cap 58 and the flange 56A on the inner end of the spring retainer 56. It is apparent that as the piston 59 moves leftwardly, away from the pivot eye 37, the enlarged end 59A will engage the spring seat 61 and compress the spring 60 against the retainer flange 56A. This direction of motion will develop an increased resistance to the clockwise rotation of the bellcrank arms 44 and 45. When the motion of the feel cartridge 38 goes in the opposite direction, so that the spring retainer 56 is caused to move rightwardly relative to the cylinder 57, the internal enlarged flange will compress the spring 60 and increase the resistance to counterclockwise motion of the bellcrank arms 44 and 45. Adjustment of the amount of resistance developed in the feel cartridge 38 is obtained by relatively threadedly adjusting the cylinder 57 on the end cap assembly 58. A suitable needle valve 62 is provided in the end cap 58 so as to act as an adjustable damper by regulating the rate of air flow into and out of the end cap 58 behind the piston 59A. It is not believed necessary to describe in detail the construction of the feel cartridge 40 as it will be identical with the structure just described for the feel cartridge 38. In the same way, the action of the feel cartridge 40 will exert resistance to movement of the bellcrank arms 49 and 51 for either clockwise or counterclockwise rotation about the pivot post 50.

Reference will now be made to FIG. 5 wherein there is disclosed a transducer 64 which is removably attached to the feel cartridge 40 by a suitable clamp 65 such that the projecting operating rod 66 will be securely aligned in parallelism with the movable piston rod 67 for the feel cartridge 40. An operating link 68 is attached to the rod 66 between a pair of securing nuts 69, and the other end of the link 68 is captured between the adjusting nuts 70 on the rod 67. The transducer 64 is electrically activated by the rod 66 moving an internal core through the fields of the coils (not shown) and in this way electrical signals are generated and transmitted through the several wires in the projecting wire bundle 71. FIG. 6 shows a second transducer 72 which is attached to the feel cartridge 38 by a suitable clamp 73 which will hold the transducer 72 in a position with its operating rod 74 in parallelism with the piston rod 59. Motion of the piston rod 59 is transmitted by link 74 connected between the adjusting nuts 75 on the piston rod 59, and connected to the transducer operating rod 74 between nuts 76. The electrical signals generated by the transducer 72 are transmitted by the wire bundle 77. The transducers 64 and 72 are constructed so as to impose little or no resistance on the motion of the piston rods for the feel cartridges 38 and 40. The signals carried in the wire bundle 71 are suitably connected to the usual pitch control surfaces, while the signals carried in the wire bundle 77 operate the usual roll control surfaces. As pointed out before yaw control is obtained by the pilot operating the usual foot pedals.

The foregoing specification has set forth a presently preferred embodiment of the aircraft flight controller depicted in the several views of the accompanying drawings. One of the important advantages for the flight control herein shown resides in the mounting for the hand grip 23. It has been pointed out that the hand grip 23 is carried on a fixed post 28 by means of a two-axis universal joint having its point of intersection located by the post in the palm of the hand gripping the hand grip 23. This position arrangement provides the pilot with a hardpoint against which forces may be directed without disturbing any given position of control of the hand grip 23. In other words, when a pilot is in a maneuver that causes g forces to be imposed on the body or the arm, the hand grip 23 will provide a steady rest by reason of the fixed post 28, thereby giving the pilot a support to withstand g forces pulling on the arm and hand, and such forces that the pilot exerts against the fixed post 28 will not interfer with or cause the pilot to change the position of the hand grip 23.

FIG. 2 illustrates an important feature of the present hand grip 10. It is seen that the trigger T is movable about a pivot 78, and the body of the trigger in the grip is prevented from moving in a clockwise direction by a stop pin 79. The form of the trigger is such that the pull of the forefinger to actuate it must be along a line X—X which extends through the pivot joint of the universal joint. Thus, when the trigger is actuated the necessary force will be directed into the pivot and will not produce any movement of the grip 10 to cause a change in the pitch control which is not desirable. Also, it is seen in FIG. 2 that counterclockwise motion of the grip 10 for nose down pitch is easily carried out by applying little finger pressure at the pressure point indicated by arrow 80 below the universal joint and thumb pressure at arrow 81 above the universal joint. This produces counterclockwise motion of the grip 10. For opposite nose up pitch the trigger finger can exert pressure at arrow 82 without causing the trigger to function, as the direction of pressure application is against the stop 79. Also pressure from the heel of the hand at arrow 83 on flange 17 will effect the grip motion for nose up pitch. thus, the pressure points indicated generally at the arrows 80 and 81, and 82 and 83, are located on opposite sides of the principal pivot for the grip 10 and have moment arms of a length to improve the ease of manipulating the grip 10 and aid in reducing fatigue.

Accordingly the hand grip 23 through the fixed post 28 and the universal joint located in the palm area of the hand will effectively ground out inertia and g forces, as well as eliminate body couple which would normally cause movement of the grip and result in the position of undesirable control forces. As an aid to the function of the post 28 being a fixed point, the arm cushion 18 is formed with a concave recessed surface 18A flanked by a raised inside margin 18B which is higher than the outside margin 18C. This dished or curved cushion provides the pilot with a margin 18B which he can pull against when turning the head to the left.

Modifications may be made within the principals of the present embodiment without departing from the spirit of the present invention.

What is claimed is:

1. An aircraft flight controller for imparting signals to the aircraft attitude controls comprising: a hand grip member, a universal joint device mounted within said grip member to locate the intersection of a plurality of aircraft attitude axes at substantially the center of the fist gripping said grip member, a fixed post supporting said universal joint device such that said hand grip member is free to swing relative to said post and in directions about any of said axes, and signalling devices operatively connected to said hand grip member at locations displaced from each other and from said intersection of said axes.

2. An aircraft flight controller comprising a post fixed in position by being secured at one end and having an opposite outer end, a frame supporting said one end of said post, a hand grip operatively connected to said opposite outer end of said fixed post to move relative to said fixed post and about a fixed point on said post defined by the intersection of two axes at right angles to each other, forearm cushion means carried by said frame in position to support the forearm generally perpendicular to one of said two axes and generally parallel with the other of said two axes, said cushion means being movable toward and away from said hand grip and being adjustable angularly relative to said fixed post, said hand grip having a skirt spaced from said fixed point and movable relative to said fixed post in either of two directions established by said two axes, means connected to said hand grip to limit the motion thereof about each axis and normally holding said hand grip in a neutral flight control position, and other means connected to said hand grip to translate the motion of said hand grip about said axes into flight control signals.

3. The flight controller of claim 2 wherein said hand grip is a hollow body representing an exterior surface formed to be grasped in the palm and fingers of a hand, and means in said hollow body forming the operative connection to said outer end of said fixed post.

4. The flight controller of claim 2 wherein said operative connection between said hand grip and said outer end of said fixed post is a thimble supporting said hand grip and a two-axis universal joint carried by said fixed post.

5. The flight controller of claim 2 wherein said operative connection between said hand grip and said fixed post outer end is a thimble having a flanged skirt supporting said hand grip, and means on said skirt oriented one with each of said axes forming a connection for said motion translation means.

6. An aircraft flight controller for imparting flight directing signals to control surfaces which govern pitch and roll functions of an aircraft, said controller comprising: a post fixed at one end and extending to a free outer end, a hand grip member having a hollow interior open at one end, a joint device having a pitch axis and a roll axis operatively connecting said post outer end and the interior of said hand grip member with said latter member positioned with said post projecting into the hollow interior through the open end, pitch signalling means operatively connected to said hand grip member, and roll signalling means operatively connected to said hand grip member, said connections being made adjacent said open end of said hand grip member and in spaced apart relation to correspond with said respective axes of said joint device, whereby the operation of said hand grip to generate flight control signals is centered in tilting motion of said hand grip about the outer end of said fixed post substantially independent of the exertion of hand pull or push generally perpendicular to the axis of elongation of said fixed post.

7. An aircraft flight cntroller for generating flight control signals, said flight controller comprising an elongated support fixed in position and having an outer end, an elongated hand grip operably mounted over the outer end of said fixed support, and means responsive to the operation of said hand grip relative to said fixed support to transmit flight control signals, said hand grip supporting the center of the palm of the hand substantially at the outer end of said fixed support, whereby the operation of said hand grip to generate flight control signals is centered in tilting motion of said hand grip about the outer end of said fixed support substantially independent of the exertion of hand pull or push generally perpendicular to the axis of elongation of said fixed support.

* * * * *